Jan. 14, 1969  H. A. ARBIT  3,421,960
BONDING TECHNIQUE AND APPARATUS FOR PLASTIC STRUCTURES
Filed April 1, 1964  Sheet 1 of 2
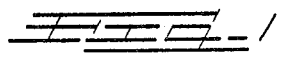
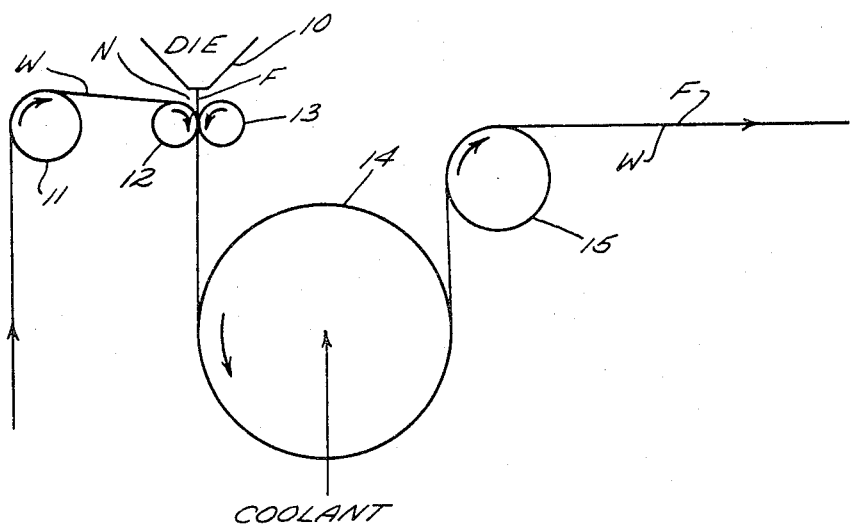
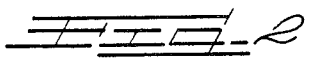
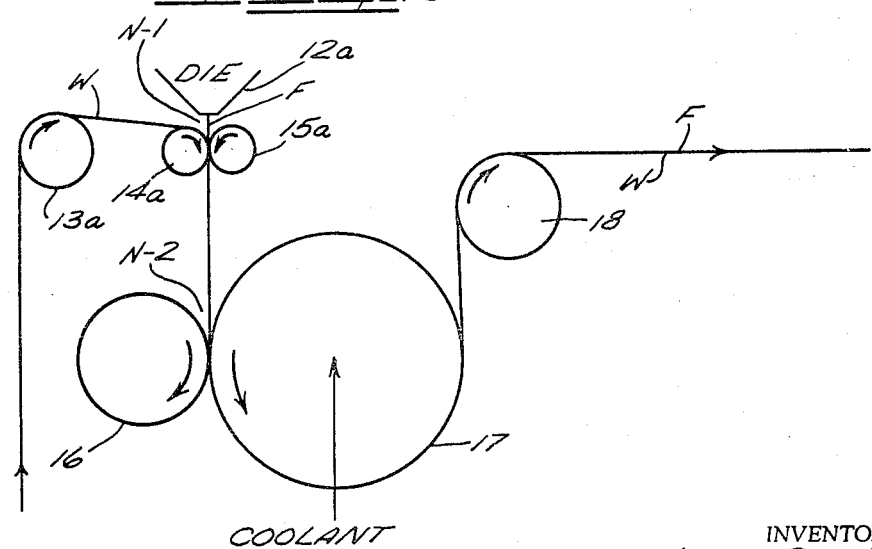
INVENTOR.
Harold A. Arbit
BY
ATTORNEYS

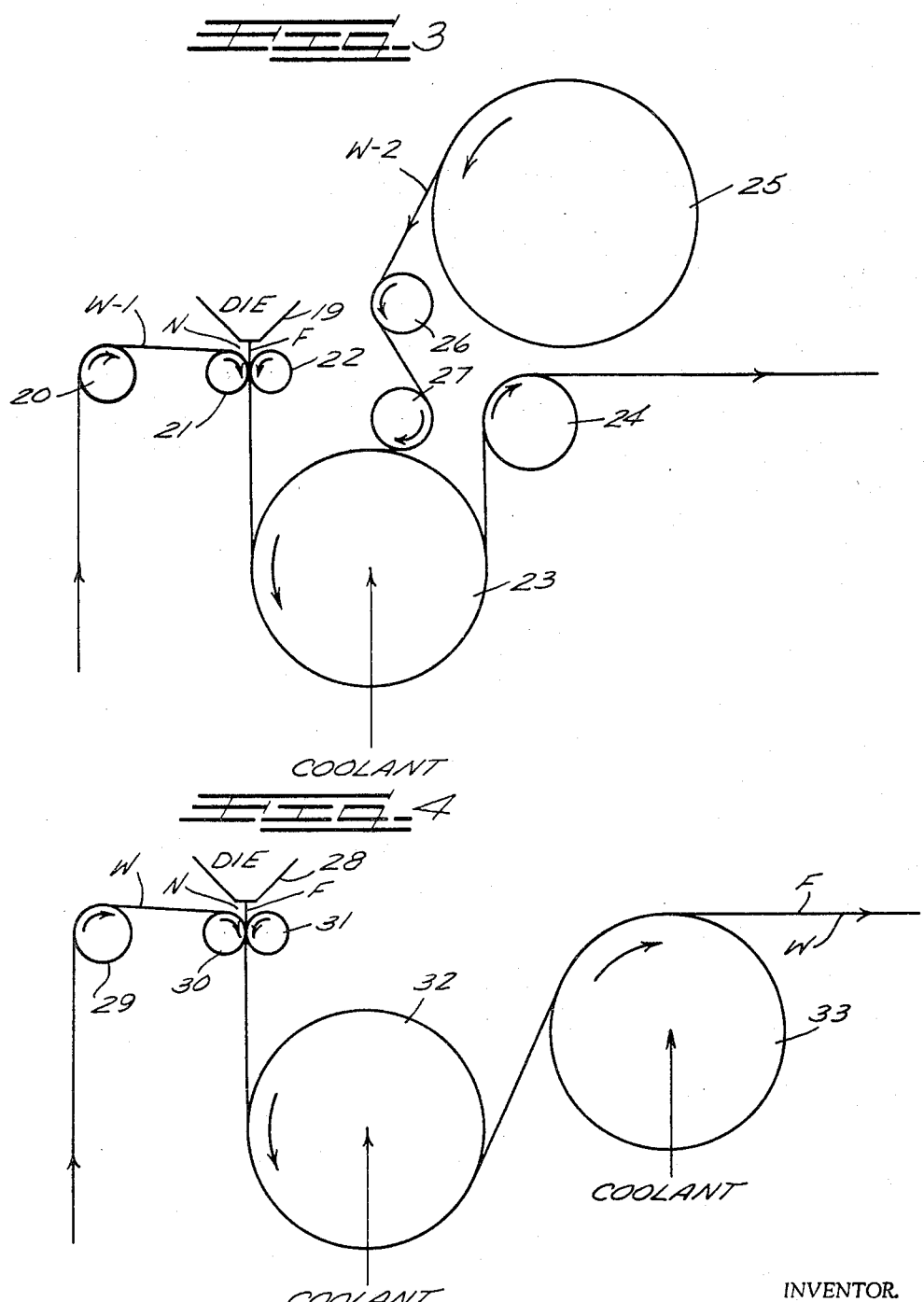

United States Patent Office 3,421,960
Patented Jan. 14, 1969

3,421,960
BONDING TECHNIQUE AND APPARATUS FOR
PLASTIC STRUCTURES
Harold A. Arbit, Rockford, Ill., assignor to Beloit Corporation, Beloit, Wis., a corporation of Wisconsin
Filed Apr. 1, 1964, Ser. No. 356,627
U.S. Cl. 156—244                                    11 Claims
Int. Cl. B29c 27/00; B32b 31/00

ABSTRACT OF THE DISCLOSURE

A coating mechanism receiving an extruded plastic and a web in a first pressure nip and thereafter immediately passing the plastic coated web into a second pressure nip with a cooled roll engaging the plastic.

---

The present invention relates to coating machines and more particularly to machines for coating web material such as paper with a film of thermoplastic polymer and to the method of coating.

A film of normally solid synthetic linear polymer having a sharp melting point can be coated upon a sheet of supporting base such as paper by feeding the sheet of supporting base together with a sheet of normally solid molten synthetic linear polymer into the nip of two adjacent parallel rolls rotating in opposite directions and cooling the roll which is in contact with the synthetic linear polymer, while compressing the sheet of the supporting base material and the sheet of molten polymer. In attempting to coat or laminate various types of plastic materials, such as by the above, which may be referred to as extrusion laminating, it is found that satisfactory bonding is not always achieved, due to heat losses, without resorting to excessive temperatures which degrade the plastic, or without resorting to the use of excessively high nip pressures which force the plastic into intimate contact with the sheet or substrate resulting in wrinkling, poor optical and other appearance defects. To obtain satisfactory bonding it has also been the practice to use adhesion promotors or primers which involve added cost and additional production operations.

In techniques commonly employed for the above process, the molten plastic is extruded through a linear slot die and is drawn down into the nip of two rolls located directly below the die. These rolls commonly comprise a rubber covered pressure roll engaging the substrate sheet, and a double shell chrome plated steel cooling roll. The substrate is brought in over the rubber roll and is forced against the hot film at the nip. The plastic, such as polyethylene, is simultaneously quenched and solidified against the cooling roll. Thus heat bonding and quench cooling occur at substantially the same time and at the same place, in effect opposing each other, and often resulting in unsatisfactory bonding.

It is accordingly an object of the present invention to avoid difficulties in the above laminating process encountered by prior art methods and devices and to accomplish the heat bonding step first and separate from the quench cooling step to prevent premature chilling and to obtain the optimum advantages of the adhesive properties of the plastic in its hot extruded state.

A further object of the invention is to provide a method and apparatus for laminating thermoplastic to a sheet wherein bonding is accomplished at the available optimum temperature of the hot plastic, yielding optimum adhesion without degradation and minimizing heat loss in air by the use of small diameter bonding rolls and short draw distances.

A still further object of the invention is to provide a method and apparatus for laminating plastic film to a sheet wherein quench cooling is carried out after bonding without adversely affecting adhesion and allowing greater latitude of control over the rate of cooling, and wherein nip pressures can be maintained at a minimum thereby preventing wrinkling and other appearance defects which were encountered in methods heretofore available.

A still further object of the invention is to provide a laminating process and apparatus of the type above discussed wherein adhesion promotors or primers become unnecessary or are reduced to a minimum to be used only for extremely difficult cases, and wherein higher line speeds and output rates can be utilized to reduce costs of production while maintaining a satisfactory and improved product and wherein lower film or coating weights can be applied due to improve bonding thereby obtaining new and improved products.

Other objects, advantages and features will become more apparent with the teaching of the principles of the invention in connection with the disclosure of the preferred embodiments thereof in the specification, claims and drawings, in which:

FIGURE 1 is a schematic elevational view of a plastic extrusion coater constructed and operating in accordance with the principles of the present invention;

FIGURE 2 is a schematic elevational view of another form of the coater;

FIGURE 3 is a schematic elevational view of yet another form of the coater; and

FIGURE 4 is a schematic elevational view of a modified form of the coater.

AS SHOWN ON THE DRAWINGS

As illustrated in FIGURE 1, a thermoplastic polymer film is supplied from a die 10. The film is supplied to the die from conventional mechanism including a hopper, not shown, which receives normally solid thermoplastic and an extruder receives the thermoplastic from the hopper and heats it for forcing it through the die 10. The thermoplastic is heated by the extruder such as by working and/or being heated by external heating means and exudes from the die 10 in a thin sheet of film F.

Various types of plastic films may be employed including such materials as polyethylene, polypropylene, polystyrene, polyvinyl chloride, copolymers of these and the like.

The film F of thermoplastic is laminated to a web of substrate or base material which includes such as paper, paper board, foil or foil combinations, cellophanes, Mylar, woven or non-woven cloths, combinations of these and the like.

The web W is fed over a guide roll 11 and onto the surface of a pressure laminating roll 12 which forms a nip with another pressure laminating roll 13. The web may be treated prior to laminating such as by being passed over a spreader roll, not shown, which may be a Mt. Hope roll to remove wrinkles therein and also may be fed over a preheat roll, not shown.

In the nip N between the rolls 12 and 13 the web W is bonded to the film F with the film being in its plastic heated state. Inasmuch as the film is not cooled in the nip N improved bonding contact is achieved. The pressure in the nip applied by the rolls 12 and 13 is adequate only to achieve satisfactory bonding and excessive pressures are no required such as where one of the rolls was cooled as in devices heretofore employed. Also, the plastic film need be heated to a temperature only adequate for plasticizing and to achieve satisfactory bonding and excessive temperatures are not required which tend to degrade the plastic. The plastic is preferably heated to a temperature which does not exceed the plasticizing temperature of the plastic used by more than 100° F. Other treatments such as the addition of adhesion promoters or primers are eliminated or reduced and adverse effects which may result in wrinkling or poor optical or appearance defects are eliminated and the operation in the nip N is devoted entirely to optimum bonding without having to encounter or compensate for adverse cooling effects.

The joined web W and film F is directed downwardly from the rolls 12 and 13 with the film still in the plastic state and the film is thereafter immediately cooled by passing over a chill roll 14. The chill roll is supplied with coolant, as shown diagrammatically, and is maintained at a surface temperature below the solidification temperature of the plastic in order to chill the film to a temperature between 10° C. to 120° C. The temperature of the roll surface is preferably maintained in the range of 5° C. to 60° C. The film at the time of contact with the web in the nip N is in a temperature range of 120° C.–350° C. and is only slightly below that after it is bonded to the web W and before it reaches the chill roll 14. The thermoplastic film F solidifies after engaging the surface of the chill roll 14 and thereafter the laminated web and film pass up over a guide roll 15 to a winder or to other treatment for the laminated sheet.

The chill roll 14 may be of large diameter to provide for simple adequate cooling and its diameter is dictated only by the size needed for cooling and by the space available and is not limited as it may be if it forms part of the pressure nip for laminating as was the case in methods and mechanisms heretofore used. Also the laminating rolls 12 and 13 may be maintained small to obtain a narrow nip and to obtain the nip pressure desired. The roll 12 may be of various constructions and is preferably a rubber surface. Cooling means may be provided to protect the rubber surface against damage. Rubber surfaces of synthetic or natural rubber may be used and preferred rubbers for this purpose are vulcanized nature rubber, vulcanized chloroprene rubber and good results are also obtained from other synthetic rubbers such as vulcanized butadiene-styrene polymers, vulcanized butadiene-acrylonitrile polymers, vulcanized chlorosulfonate solid ethylene polymer, neoprene, silicone and the like. The rubber also may be coated with a thin film or layer of polytetrafluoroethylene, at least at the edges of the web to avoid the film extending over the edges of the paper web and adhering to the rubber roll. This polytetrafluoroethylene, known by the trade name Teflon, may be attached to the rubber roll such as by a pressure sensitive adhesive or may be a sleeve fitted over the roll. The film may be of any suitable thickness but it is preferred that it be thin so that it does not interfere with the compressibility of the rubber on the roll 12. For example, a film of Teflon of 0.002–0.005 inch thick has been quite suitable employing a rubber covering for the roll 12 having a Shore durometer hardness of about 60.

The roll 13 is provided of a material that will not cause the molten film to stick thereto and preferably has an outer surface of polytetrafluoroethylene, known by the trade name Teflon.

The film F for coating may be a synthetic linear polymer having a sharp melting point, and suitable polymers include normally solid ethylene polymers, polyamide resins (e.g. polyhexamethyleneadipamide; polypentamethylenesebacamide; polypropylene; polyamide mixtures obtained by interpolymerizing a mixture of hexamethylene-diammonium adipate and hexamethylene-diammonium sebacate with caprolactam; and indeed any of the other synthetic linear polyamides disclosed in U.S. Patents 2,071,250, 2,071,253, 2,130,948, and 2,130,523), chlorinated normally solid ethylene polymers, especially those having from 20% to 40% by weight of chlorine, normally solid ethylene/vinyl acetate interpolymers, polystyrene, hydrolyzed normally solid ethylene/vinyl acetate interpolymers, and the like. The preferred polymer employed in the practice of the invention is normally solid ethylene polymer.

In the arrangement of FIGURE 2, thermoplastic film F is extruded from a die 12a, and a substrate web W passes over a guide roll 13a in to a nip N-1 formed between laminating rolls 14a and 15a. The laminated web and film then pass downwardly over a coolant roll 17, and in the arrangement of FIGURE 2 a roll 16 forms a nip N-2 with the coolant roll to aid in the lamination bonding as the film is being cooled to the solidification point. The laminated web and film then pass over a guide roll 18 to a winder.

In the arrangement of FIGURE 3, heated film F is extruded from a die 19 and is laminated to a web W–1 which passes over a guide roll 20 into a nip N formed between laminating rolls 21 and 22. The laminated film F and web W–1, with the film still in the molten form, pass downwardly over a coolant roll 23 but a second web W–2 is applied to the exposed surface of the film. The web W–2 is fed off a supply roll 25 down over guide rolls 26 and 27 to be laid over the surface of the cooling roll 23 in advance of the location where the web W–2 engages the film F. The laminated layers with the film F therebetween are fed up over a guide roll 24 to a winder.

In the arrangement of FIGURE 4, a film F is extruded from a die 28 and laminated to a web W which passes up over a guide roll 29 and into a nip N between laminating rolls 30 and 31. The film then engages a coolant roll 32 and a succeeding coolant roll 33 is provided with the roll 33 engaging the web side of the laminate. The rolls 32 and 33 are arranged to flex the laminate in arcs of alternate curvatures and the film will be solidified in its passage over the surfaces of the rolls 32 and 33.

Thus it will be seen that I have provided an improved coating or laminating mechanism method which meets the objectives and advantages above set forth. In operation, as illustrated in FIGURE 1, the molten film F is laminated to a web W between a pair of rolls 12 and 13 which do not cool the lamination and the laminated layers then travel downwardly to subsequently become cooled in engagement with a cooling roll 14 at which time the film is solidified. The arrangement is capable of high speed operation and provides an improved product.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A process of applying a film of normally solid synthetic linear polymer of sharp melting point to a sheet which comprises, feeding said sheet into the nip of two adjacent parallel rolls rotating in opposite directions, extruding a molten film of polymer parallel to said rolls and downwardly into the nip of said rolls with the film contacting the sheet at the nip of said rolls, passing said film and sheet through the nip of said rolls under positive pressure from the rolls, immediately thereafter feeding the laminated sheet and film into the nip of two adjacent parallel second rolls rotating in opposite directions, and cooling the roll of said second rolls in contact with the film to a temperature below the solidification point of said film.

2. A process of applying film of a normally solid synthetic linear polymer of sharp melting point between sheets which comprises, feeding a first sheet into the nip of two adjacent parallel rolls rotating in opposite directions, extruding a molten film of said polymer parallel to said rolls and downwardly into the nip of said rolls and passing the film and sheet through the nip of said rolls under positive pressure, feeding the laminated sheet and film into the nip of two adjacent parallel second rolls rotating in opposite directions, feeding a second sheet into the nip of the second rolls against the film and compressing the sheets in said nip, and cooling the roll of said second rolls which is in contact with the second sheet to a temperature below the solidification point of said film.

3. A process of applying a film of normally solid synthetic linear polymer of sharp melting point to a sheet which process comprises, contacting a molten film of polymer against the sheet, applying a pressure directly against the film and an opposing pressure against the sheet pressing the film against the sheet, and subsequently again pressing the molten film against the sheet and simultaneously chilling the exposed surface of the film to a temperature below the solidification point of the film.

4. A process of applying a film of normally solid synthetic linear polymer of sharp melting point to a sheet which process comprises the steps, first contacting a film of molten polymer with said sheet, passing the film and sheet between a pair of compressing rolls forming a nip therebetween pressing the film to the sheet, and subsequently again pressing the molten film against the sheet and simultaneously chilling the film to a temperature below the solidification point of the film.

5. A process of applying a film of normally solid synthetic linear polymer of sharp melting point to a sheet which process comprises, carrying out the steps of contacting a molten film of polymer with said sheet applying a pressure directly against the film and an opposing pressure against the sheet pressing the film against the sheet, said molten film at the time of contact with said sheet being at a temperature of 120° C.–350° C., and subsequently again pressing said molten film against said sheet and chilling the exposed surface of said molten film to a temperature in the range of 10° C.–90° C.

6. A coating mechanism comprising, means for extruding a molten film of normally solid thermoplastic polymer, first means including a pair of compressing rolls forming a nip therebetween for contacting the molten film with a supporting base of web material and for compressing the molten film against said web material, and second means positioned after said first means for compressing and cooling the laminated film and web.

7. A coating mechanism comprising, means for extruding a molten film of normally solid thermoplastic polymer, a first pair of compressing rolls pressing the molten film against a supporting base of web material, and a second pair of compressing rolls positioned after the first at least one of which is cooled for cooling the web and film in said second rolls.

8. A machine including, first parallel counter rotating rolls adapted to bond in the nip between the rolls a thin sheet of heated normally solid themoplastic surfacing material to a surface of a continuous sheet of web-like material, second parallel counter rotating compressing rolls positioned after said first rolls, and means for cooling the film between said second rolls.

9. A machine including, first parallel counter rotating rolls adapted to bond in the nip between the rolls a thin sheet of heated normally solid thermoplastic surfacing material to a surface of a continuous sheet of web-like material, second parallel counter rotating compressing rolls positioned after said first rolls, and means cooling the roll of said second rolls which engages the surface of the film.

10. A machine including, first parallel counter rotating rolls adapted to bond in the nip between the rolls a thin sheet of heated normally solid thermoplastic surfacing material to a surface of a continuous sheet of web-like material, second parallel counter rotating rolls positioned after said first rolls, means cooling the roll of said second rolls which engages the surface of said web-like material, and means feeding a continuous sheet of web-like material into the nip between said second rolls against the thermoplastic material.

11. A coating mechanism comprising, means for extruding a molten film of normally solid thermoplastic polymer, a first pair of rolls forming a compressing nip therebetween for pressing said film to a web, a second pair of compression rolls following the first pair forming a nip therebetween for receiving the film and web with one roll engaging the film, and means cooling said one roll to a temperature in the range of 5° C. to 60° C.

References Cited

UNITED STATES PATENTS

| 2,815,308 | 12/1957 | Robinson et al. | 156—244 X |
| 3,011,217 | 12/1961 | Carlson | 156—498 X |
| 3,161,560 | 12/1964 | Paquin et al. | 156—244 X |
| 3,165,432 | 1/1965 | Plaskett | 156—244 |
| 3,196,063 | 7/1965 | Paquin et al. | 156—244 X |

EARL M. BERGERT, Primary Examiner.

T. R. SAVOIE, Assistant Examiner.

U.S. Cl. X.R.

156—306, 500